US012645493B2

(12) United States Patent
Andersson et al.

(10) Patent No.: US 12,645,493 B2
(45) Date of Patent: Jun. 2, 2026

(54) SYSTEM INTEGRATION PLATFORM

(71) Applicant: MTEK INDUSTRY AB, Alfta (SE)

(72) Inventors: Bengt Mattias Andersson, Alfta (SE);
Tobias Leif Anders Grossman, Alfta
(SE); Maksim Olifer, Huddinge (SE);
Paul Ulf Anders Norström, Alfta (SE);
Adam Olov Julius Sundberg, Alfta
(SE); Tord Johnsson, Alfta (SE); **Per
Anders Westerfur**, Stråtjära (SE)

(73) Assignee: MTEK Industry AB, Alfta (SE)

( * ) Notice: Subject to any disclaimer, the term of this
patent is extended or adjusted under 35
U.S.C. 154(b) by 628 days.

(21) Appl. No.: 18/167,131

(22) Filed: Feb. 10, 2023

(65) Prior Publication Data

US 2024/0272937 A1 Aug. 15, 2024

(51) Int. Cl.
*G06F 9/48* (2006.01)
*G06F 9/451* (2018.01)

(52) U.S. Cl.
CPC ............ *G06F 9/4881* (2013.01); *G06F 9/451*
(2018.02)

(58) Field of Classification Search
CPC .......... G06F 9/4881; G06F 9/451; G06F 8/34;
G06F 9/541
See application file for complete search history.

(56) References Cited

U.S. PATENT DOCUMENTS 5,390,314 A 2/1995 Swanson
5,768,506 A 6/1998 Randell 5,966,532 A 10/1999 McDonald et al.
6,421,821 B1 7/2002 Lavallee
6,505,341 B1 1/2003 Harris et al.
6,671,691 B1 12/2003 Bigus
(Continued)

FOREIGN PATENT DOCUMENTS

CN 106375481 A 2/2017
WO 2008150680 A2 12/2008
WO 2015031053 A1 3/2015

OTHER PUBLICATIONS

Office action issued by the Swedish Intellectual Property Office on
May 21, 2025.
(Continued)

*Primary Examiner* — Jorge A Chu Joy-Davila
(74) *Attorney, Agent, or Firm* — Noréns Patentbyrå AB

(57) ABSTRACT

Methods and apparatus, including computer program prod-
ucts, for defining, through a no-code graphical user inter-
face, a sequence of functionality blocks defining a process to
be performed by a system integration platform, and wherein
each functionality block is configured to execute an opera-
tion on one or more input parameters to the functionality
block to produce one or more output parameters from the
functionality block. The system integration platform
receives, source system data that includes one or more input
parameters for a first functionality block. Data from the one
or more source systems is processed by traversing the
functionality blocks in a unidirectional manner from a
beginning to an end, where one or more output parameters
from a functionality block serves as input parameters for one
or more immediately subsequent functionality blocks. A last
functionality block outputs destination system data to be
ingested by the one or more destination systems.

20 Claims, 6 Drawing Sheets

(56) References Cited

U.S. PATENT DOCUMENTS

| | | | |
|---|---|---|---|
| 6,698,010 B1 | 2/2004 | Yamanouchi et al. | |
| 6,957,110 B2 | 10/2005 | Wewalaarachchi et al. | |
| 7,159,185 B1 | 1/2007 | Vedula et al. | |
| 7,317,959 B2 | 1/2008 | Pfander et al. | |
| 7,562,340 B2 | 7/2009 | Kosov et al. | |
| 7,668,613 B2 | 2/2010 | Baier et al. | |
| 8,065,168 B2 | 11/2011 | Szlam | |
| 8,239,055 B2 | 8/2012 | Grove et al. | |
| 8,365,086 B2 | 1/2013 | Grace et al. | |
| 8,656,350 B2 | 2/2014 | Bates et al. | |
| 9,256,403 B2 | 2/2016 | Limbasia et al. | |
| 9,557,988 B2 * | 1/2017 | Binjrajka | G06F 8/71 |
| 9,953,280 B2 | 4/2018 | Cooper et al. | |
| 10,878,140 B2 | 12/2020 | Snyder | |
| 2001/0034879 A1 * | 10/2001 | Washington | G06F 8/51 |
| | | | 717/100 |
| 2002/0145629 A1 | 10/2002 | Gabbert et al. | |
| 2003/0018172 A1 | 1/2003 | Eaton et al. | |
| 2003/0061266 A1 * | 3/2003 | Ouchi | G06Q 10/0633 |
| | | | 719/313 |
| 2004/0056908 A1 | 3/2004 | Bjornson et al. | |
| 2005/0086635 A1 | 4/2005 | Parikh et al. | |
| 2005/0278059 A1 | 12/2005 | Osborn et al. | |
| 2006/0020602 A9 | 1/2006 | Morgan et al. | |
| 2006/0143226 A1 | 6/2006 | Kawamura | |
| 2011/0184543 A1 | 7/2011 | Banik et al. | |
| 2011/0202688 A1 | 8/2011 | Shah et al. | |
| 2011/0258262 A1 | 10/2011 | Bezdicek et al. | |
| 2012/0102029 A1 | 4/2012 | Larson et al. | |
| 2013/0124253 A1 | 5/2013 | Cooper et al. | |
| 2016/0062747 A1 | 3/2016 | Stanfill et al. | |
| 2024/0256268 A1 * | 8/2024 | Wisse | G06F 8/656 |

OTHER PUBLICATIONS

Swedish Intellectual Property Office, Stockholm, Sweden, Office Action dated Sep. 4, 2023.

* cited by examiner

400

DEFINE A SEQUENCE OF FUNCTIONALITY BLOCK IN A NO-CODE GRAPHICAL USER INTERFACE, THE SEQUENCE OF BLOCKS DESCRIBING A PROCESS TO BE PERFORMED BY THE SYSTEM INTEGRATION PLATFORM 402

RECEIVE SOURCE SYSTEM DATA, THE SOURCE SYSTEM DATA INCLUDING INPUT PARAMETERS FOR THE SEQUENCE OF FUNCTIONALITY BLOCK 404

PROCESS SOURCE SYSTEM DATA BY TRAVERSING THE SEQUENCE OF FUNCTIONALITY BLOCK IN A UNIDIRECTIONAL MANNER 406

OUTPUT, FROM THE LAST FUNCTIONALITY BLOCK IN THE SEQUENCE OF FUNCTIONALITY BLOCK, DATA TO BE INGESTED BY A DESTINATION SYSTEM 408

SYSTEM INTEGRATION PLATFORM

BACKGROUND

The present invention relates to Production Systems, and in particular to techniques for improving communications between different systems involved in a manufacturing process.

A Production System is a software platform that manages and tracks production processes in real-time, providing a comprehensive view of all manufacturing operations. It helps to optimize production, improve quality, and increase efficiency by automating and digitizing the processes involved in the production line. One example of a Production System is a Manufacturing Execution System (MES).

The MES typically interacts with a range of other systems. For example, the MES can interact with other systems in the following ways:

Enterprise Resource Planning (ERP) System: The MES can receive data from an ERP system, such as production schedules, work orders, and raw materials data. The MES can also send data to the ERP, such as production output and inventory updates.

Supervisory Control And Data Acquisition (SCADA) Systems: The MES can receive real-time data from the SCADA system, pertaining to machine performance, production output, and other process variables.

Quality Management Systems (QMS): The MES can integrate with a QMS to capture and store quality data, such as inspection results and non-conformance reports.

Maintenance Management System (MMS): The MES can integrate with a MMS to schedule and track maintenance activities, such as equipment inspections and repairs.

Warehouse Management System (WMS): The MES can interact with a WMS to receive and update data on inventory levels and material movements.

CAD/CAM Systems: The MES may also receive data from computer-aided design (CAD) and computer-aided manufacturing (CAM) systems, such as machine tool paths and product specifications.

Programming a Production System that is capable of communicating with such a disparate set of external systems can be a daunting task, even for a professional programmer. Furthermore, when upgrades are made to any of these external systems, it must be ensured that the Production System can handle not only updates to the product itself, such as a new bill of material for a new color or new part, etc., but also new features of these systems themselves, and that data formats etc., remain consistent, so that there are no unexpected events in the manufacturing process. Users of MESes are typically not professional programmers and therefore frequently require high level programming techniques that are more understandable and intuitive. The increasing use of computers and data processing systems by users who are not highly trained in computer programming has led to the need for programming a data processing system that is easier to use and implement that the current systems. Accordingly, it would be desirable to have techniques for configuring a MES which are relatively easy and intuitive for a user, and which allow the user to fully customize the MES in a way that allows communication with external systems, such as the ones listed above.

SUMMARY

In some aspects, the techniques described herein relate to a method for processing, by a system integration platform, data originating in one or more source systems, into data ingestible by one or more destination systems, wherein the one or more source systems and the one or more destination systems each includes an application programming interface allowing communication with the system integration platform but not directly with one another source system or destination system, including: defining, through a no-code graphical user interface, a sequence of functionality blocks, wherein the sequence of functionality blocks defines a process to be performed by the system integration platform, and wherein each functionality block is configured to execute an operation on one or more input parameters to the functionality block to produce one or more output parameters from the functionality block; receiving, by the system integration platform, source system data, the source system data including one or more input parameters for a first functionality block in the sequence of functionality blocks; processing, by the system integration platform, data from the one or more source systems by traversing the sequence of functionality blocks in a unidirectional manner from a beginning to an end of the sequence of functionality blocks, wherein one or more output parameters from a functionality block serves as input parameters for one or more immediately subsequent functionality blocks; and outputting, from a last functionality block in the sequence of functionality blocks in the system integration platform, destination system data to be ingested by the one or more destination systems.

In some embodiments, the processing can be initiated by the system integration platform, by requesting data from, or listening to data provided by, at least one source system among the one or more source systems.

In some embodiments, one or more of the functionality blocks are pre-configured to execute the operation on the input parameters to the functionality block.

In some embodiments, one or more aspects of the operation can be configurable by a user by setting a value of a predetermined set of functionality block-specific configuration parameters.

In some embodiments, each functionality block can have a functionality block type, and a set of rules can specify what block types may precede or follow other functionality block types in the sequence of functionality blocks.

In some embodiments, the set of rules can include input/output data matching rule.

In some embodiments, the input and output parameters, respectively, can be mutable parameters and include a data type and an identifier.

In some embodiments, the data type can be a String, a Boolean, a Json, a Numeric, an Integer, or an Unsigned Integer.

In some embodiments, processing the received source system data can include converting the source system data into string value by the first functionality block in the sequence of functionality blocks, and converting string value by the last functionality block in the sequence of functionality blocks into destination system data ingestible by the one or more destination systems.

In some embodiments, at least one of the functionality blocks can have an associated completion condition that must be fulfilled prior to sending the one or more output parameters from the functionality block to the one or more subsequent functionality block.

In some embodiments, at least one of the functionality blocks receives input parameters from two different other functionality block, and the completion condition requires both input parameters to have been received by the functionality block before the functionality block can send the output parameter from the functionality block to the subsequent one or more functionality block.

In some embodiments, the functionality block can delay the processing until all input parameters have been received.

In some embodiments, a functionality block in the sequence of functionality blocks can be configurable to connect to two or more immediately preceding functionality block and/or two or more immediately subsequent functionality block.

In some embodiments, the method further includes grouping two or more functionality blocks into a unit, wherein the unit as a whole defines a more complex operation compared to that of a single functionality block, the unit being arranged to execute the more complex operation on one or more input parameters to the unit to produce one or more output parameters from the unit, and including the unit in the sequence of functionality blocks that defines the process.

In some embodiments, the unit can be configured to receive the same input parameters as the first functionality block included in the unit and to produce the same output parameter as the last functionality block included in the unit.

In some embodiments, defining a sequence of functionality blocks can further include: performing a verification of the sequence prior to processing the one or more input parameters from the source system, to ensure compliance with the rule; and generating an alert in response to an incomplete verification.

In some embodiments, the method can further include keeping information about a state of an ongoing processing of the received input parameters.

In some embodiments, the method can further include keeping a log regarding the operations performed by each functionality block in the sequence of functionality blocks.

In some embodiments, the log regarding the operations performed by each functionality block in the sequence of functionality blocks can include a time stamp, a functionality block identifier, and a message specifying when the functionality block began execution, when the functionality block completed, when the functionality block has fulfilled or failed a completion condition, and/or errors encountered by a functionality block.

In some embodiments, the functionality block types can include: Json functionality block, Request functionality block, Service functionality block, Sink functionality block, Sync functionality block, Transform functionality block, and Utility functionality block.

In some embodiments, the one or more source systems can includes: an Enterprise Resource Planning System Planning system, a Product Lifecycle Management system, a Warehouse Management system, a Content Management system and/or a Customer Relationship Management system.

In some embodiments, the one or more destination systems can include: a Manufacturing Execution System including one or more subsystems.

In some embodiments, the one or more subsystems can include: a vision system, production machinery, robots, devices, sensors, and/or tools.

In some embodiments, each functionality block can run in its own process or thread.

In some embodiments, each functionality block can be a separate executable.

In some embodiments the processing can be interpreted by a computer program providing the processing functionality block dynamically and on-the-fly based on the configuration parameters of each functionality block and how the functionality block are connected in the sequence.

In some embodiments, the outputting from the last functionality block can be done on the initiative of the last functionality block.

In some embodiments, the processing can be a recurring processing, performed iteratively or repeatedly according to a definition provided by the functionality block connection pattern and configuration parameters.

In some embodiments, the method can further include: in response to receiving changes through a no-code graphical user interface to the sequence of functionality blocks, changing the processing dynamically to perform a revised process by the system integration platform in accordance with the changed sequence of functionality blocks.

In some aspects, the techniques described herein relate to a system for processing data originating in a source system into data ingestible by a destination system, including: a memory; and a processor, wherein the memory contains instructions that, when executed by the processor perform a method as described above.

In some aspects, the techniques described herein relate to a non-transitory computer-readable storage medium for processing, by a system integration platform, data originating in one or more source systems, into data ingestible by one or more destination systems, wherein the one or more source systems and the one or more destination systems each includes an application programming interface allowing communication with the system integration platform but not directly with one another source system or destination system, the computer-readable storage medium including instructions that when executed by a computer, cause the computer to: define, through a no-code graphical user interface, a sequence of functionality blocks, wherein the sequence of functionality blocks defines a process to be performed by the system integration platform, and wherein each functionality block is configured to execute an operation on one or more input parameters to the functionality block to produce one or more output parameters from the functionality block; receive, by the system integration platform, source system data, the source system data including one or more input parameters for a first functionality block in the sequence of functionality blocks; process, by the system integration platform, data from the one or more source systems by traversing the sequence of functionality blocks in a unidirectional manner from a beginning to an end of the sequence of functionality blocks, wherein one or more output parameters from a functionality block serves as input parameters for one or more immediately subsequent functionality block; and output, from a last functionality block in the sequence of functionality blocks in the system integration platform, destination system data to be ingested by the one or more destination systems.

BRIEF DESCRIPTION OF THE DRAWINGS

In the following, the invention will be described in detail, with reference to exemplifying embodiments of the invention and to the enclosed drawings, wherein:

FIG. 4 is a flowchart illustrating a process for a system integration platform, in accordance with some embodiments.

FIG. 5 shows a library including some exemplary blocks that can be used to create MES processes, in accordance with some embodiments.

Like reference symbols in the various drawings indicate like elements.

DETAILED DESCRIPTION

The various embodiments of the invention pertain to techniques for processing data in production systems. In particular, a system integration platform, allows for a user to design custom processes for processing data originating in one or more source systems (e.g., Enterprise Resource Planning Systems), into data ingestible by one or more destination systems (e.g. Manufacturing Execution Systems), by simply connecting a series of functionality block representing different rules and operations on a no-code graphical user interface and without having special knowledge of the specific configuration parameters for the source and destination systems, respectively.

Various embodiments of the subject matter described in this specification can be implemented to realize one or more of the following advantages. Users can create custom manufacturing processes through a simple no-code graphical user interface without requiring any programming or coding knowledge, and without having detailed knowledge about specific implementation details about the various systems that are involved in a manufacturing process.

Manual processes, such as tracking production orders, scheduling maintenance, and collecting data on machine performance, etc., can be digitized by end users of the Manufacturing Execution System, without needing specially trained personnel. As a result, new processes and upgrades to existing systems can be implemented faster and be performed with greater accuracy and efficiency compared to what was previously possible, thus streamlining and operations of a manufacturing facility. The ability to adapt to changing circumstances, ultimately lead to more cost-effective manufacturing and a better ability to accommodate changing customer requirements and technology developments. Yet another important benefit is that improved manufacturing processes typically lead to fewer waste products, which has beneficial effects on the environment. Various embodiments of the invention will now be described by way of example and with reference to the drawings. However, it should be noted that these described embodiments are merely examples and that other embodiments that are not described herein may be readily available to those having ordinary skill in the art, and fall within the scope of the appended claims.

Figure 1:
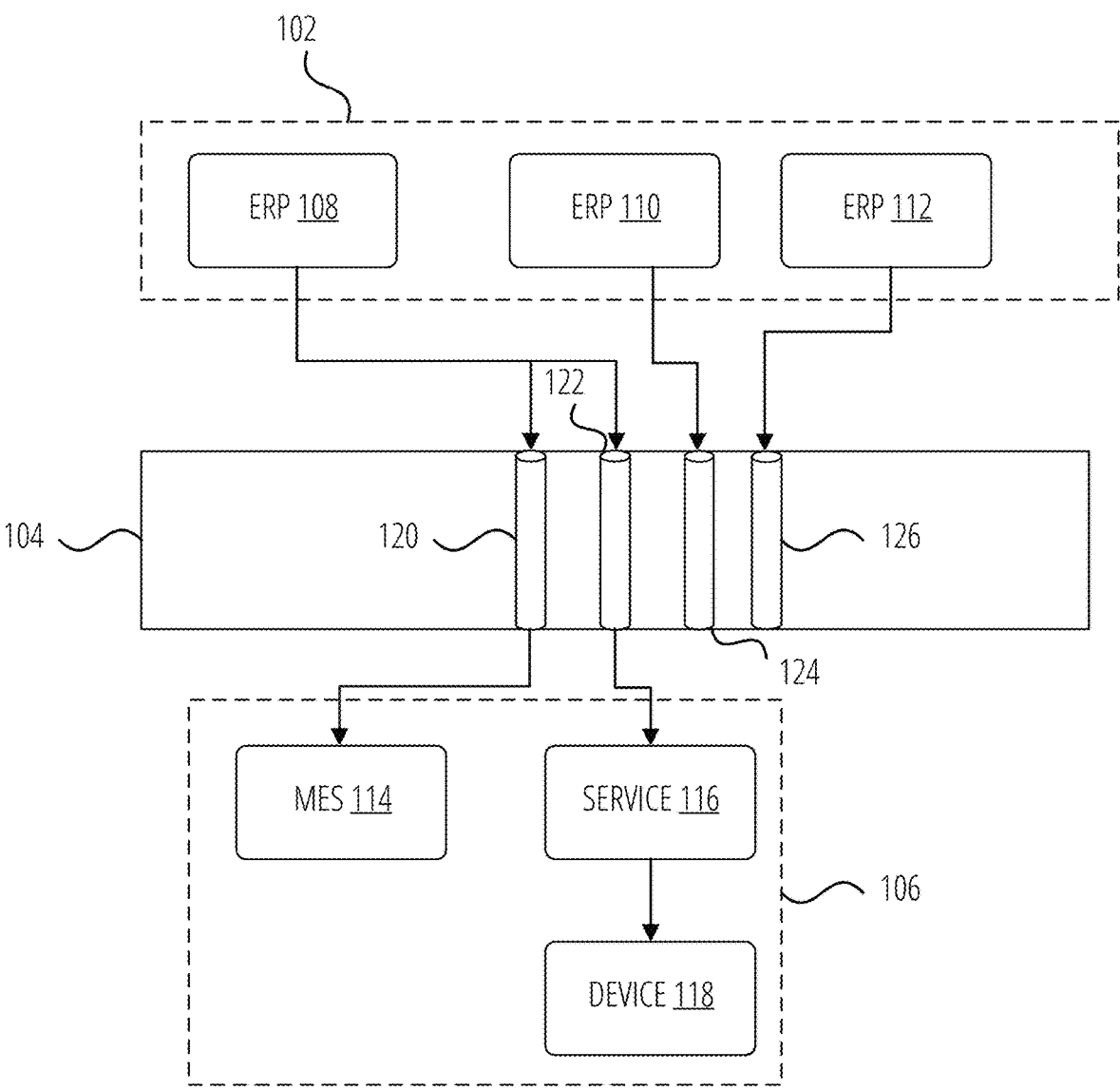
FIG. 1 is a block diagram illustrating a system, in accordance with some embodiments.

As shown in FIG. 1, in some embodiments, one or more source system(s) 102 are connected to one or more destination system(s) 106 through a System integration platform 104. The source system(s) 102 typically include one or more Enterprise Resource Planning Systems 108, 110, 112, which are familiar to those having ordinary skill in the art, but can also include other systems such as Customer Relationship Management (CRM) systems, Enterprise Resource Planning (ERP) systems, Product Lifecycle management (PLM) systems, and Warehouse Management Systems (WMS), just to mention a few examples. The destination system(s) 106 can include any of the above types of systems. FIG. 1 shows an MES 114, services 116 and/or devices 118, but it should be noted that these are merely a few non-limiting examples for illustrative and explanatory purposes.

The system integration platform 104 enables a user to define one or more processes for how to process source system data from the source system(s) 102 to become destination system data that can be ingested by the destination system(s) 106. In some embodiments, each such process is defined by a user on a no-code graphical user interface, as will be described in further detail below, by selecting one or more functionality block and stringing them together to form a process. Each such process is conceptually illustrated in FIG. 1 as a discrete integration section 120, 122, 124, 126. It should also be noted that in each integration section, the process flow occurs in only one direction, i.e., from the source system(s) 102 to the destination system(s) 106. However, in some embodiments there may be separate integration sections which define a process flow in the opposite direction, and that are applicable in situations when there is a need to transfer data from a destination system(s) 106 to source system(s) 102, for example if there is a problem with some manufacturing equipment or the like. It should also be noted that FIG. 1 is similar to what a user typically would see on a no-code Graphical user interface when setting up a user-defined process.

Figure 2:
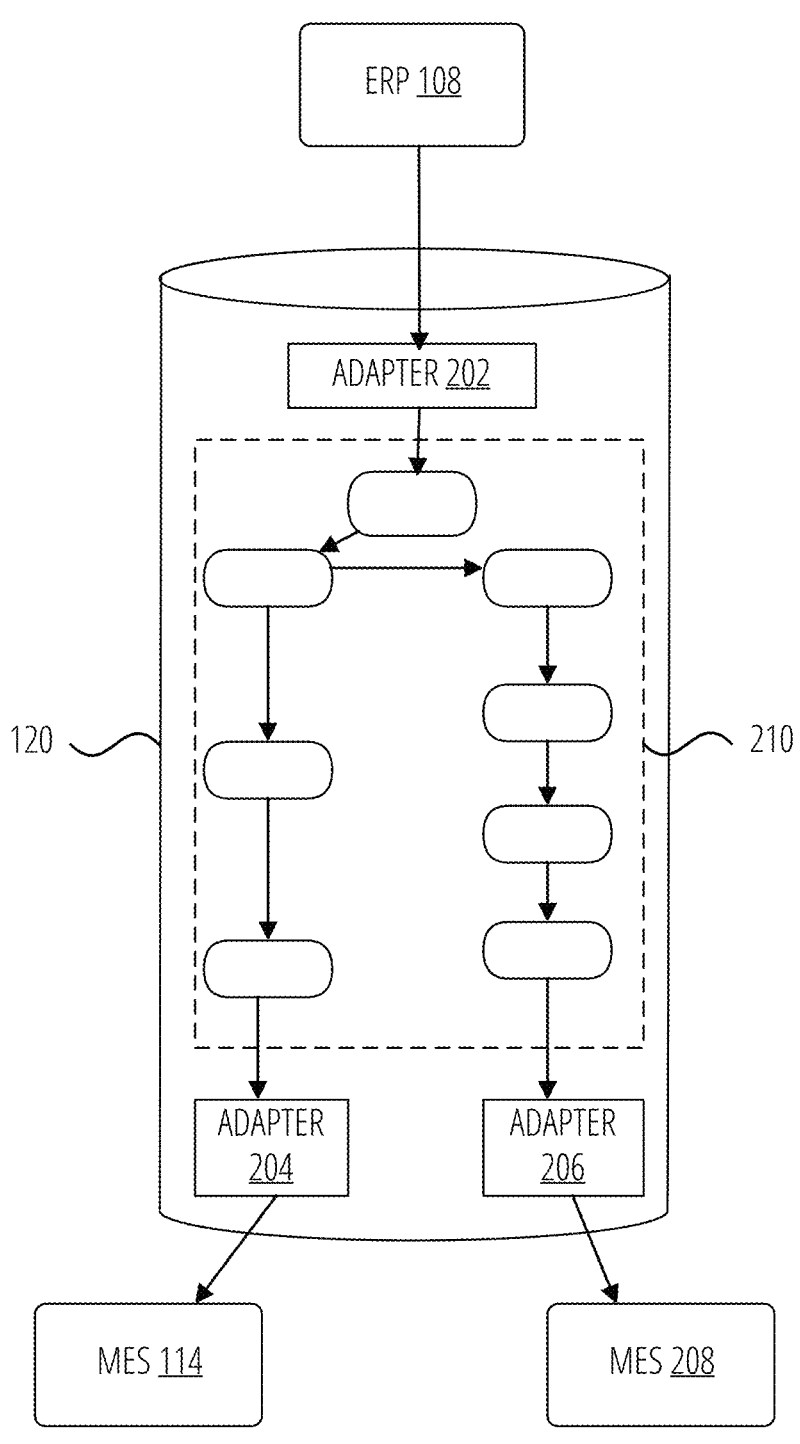
FIG. 2 is block diagram illustrating a more detailed view of an integration section, in accordance with some embodiments.

FIG. 2 shows a more detailed conceptual view of an integration section 120, in accordance with some embodiments. FIG. 2 is also similar to what a user would see on a no-code graphical user interface, in one embodiment, as a result of clicking on an integration section 120, such as integration section 120 of FIG. 1. As can be seen in FIG. 2, the integration section 120 includes a source adapter 202, which forms an interface to one of the source systems, such as Enterprise Resource Planning System 108. The purpose of the source adapter 202 is to convert source system data received from the Enterprise Resource Planning System 108 into a format that can be used by the functionality block of a user-defined process 210, which will also be described in further detail below. The integration section 120 further contains two adapters 204 and 206 respectively, whose purpose is to convert data from the generic format used by the functionality block of the user-defined process 210 into destination system data that has the appropriate format to be ingested by the destination system(s) 106. However, it should be noted again that this is merely an illustrative example and that the integration section 120 may include fewer or more adapters, depending on the embodiment at hand. Again, each destination adapter 204, 206 is specialized for each destination system, e.g., destination adapter 204 works with a first type of Manufacturing Execution System 114 whereas destination adapter 206 works with a second type of Manufacturing Execution System 208. In between the source adapter 202 and respective destination adapters 204, 206, the data is processed by the respective functionality block which constitute the user-defined process 210, and the data has a format which each individual functionality block can read, write, and process according to the specific task that the functionality block is designed to perform.

Distinct types of computers can be used to perform the above-described functionality. The essential elements of a computer are a processor for performing instructions and one or more memory devices for storing instructions and data. As used herein, a "computer" can include a server computer, a client computer, a personal computer, embedded programmable circuitry, or a special purpose logic circuitry.

Figure 3:
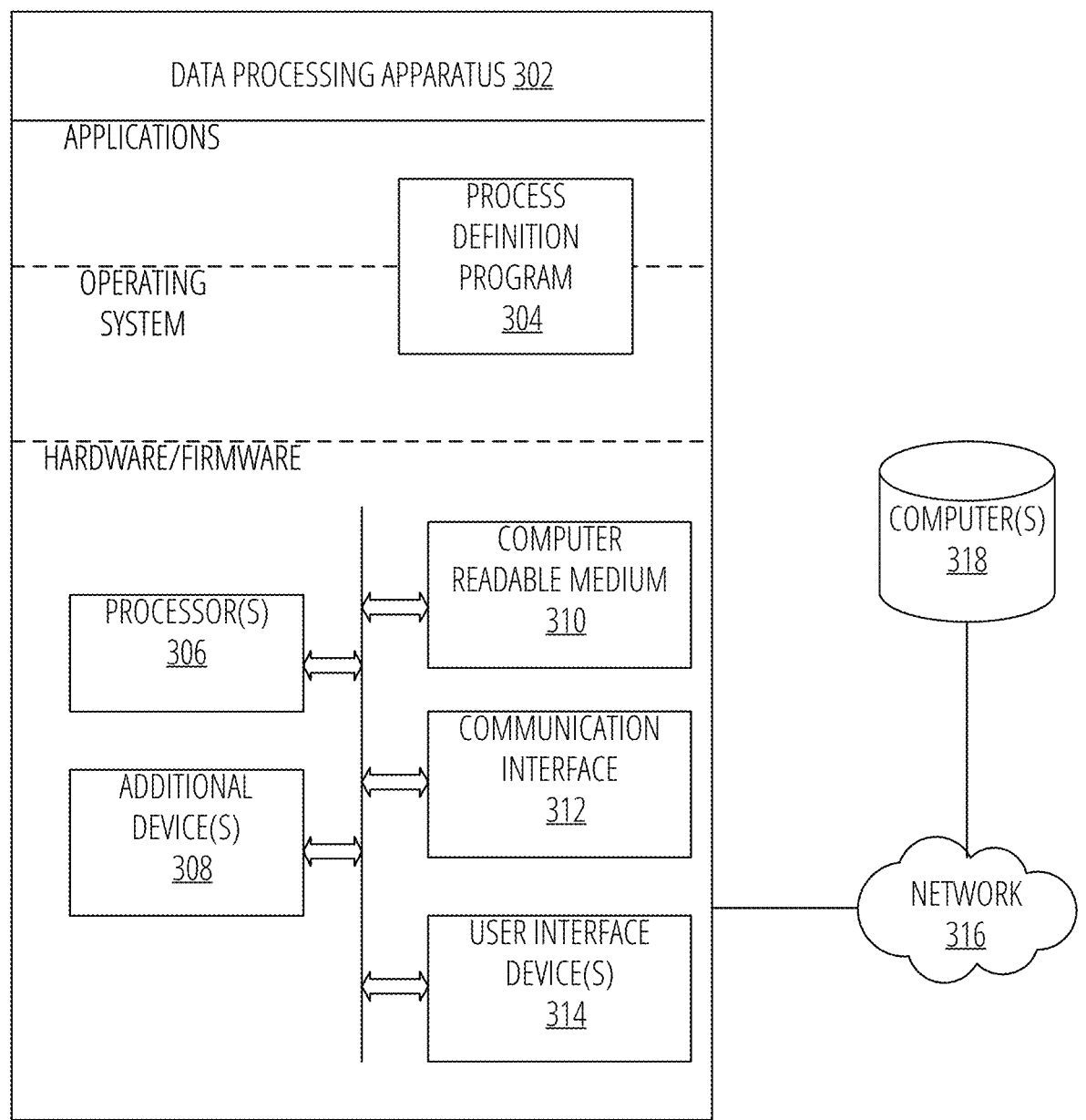
FIG. 3 is a block diagram illustrating a data processing apparatus, which can be used to implement the methods described herein, in accordance with some embodiments.

FIG. 3 is a schematic diagram of a data processing system including a data processing apparatus 302. The data processing apparatus 302 can be connected with one or more computer(s) 318 (including computers included in the source system(s) 102 and destination system(s) 106, respectively) through a network 316.

The data processing apparatus 302 can include various software modules, which can be distributed between an applications layer and an operating system. These can include executable and/or interpretable software programs or libraries, including a process definition program 304, for example. The number of software modules used can vary from one implementation to another. Also, in some cases, the process definition program 304 can be implemented in embedded firmware, and in other cases, the process definition program 304 can be implemented as software modules that are distributed on one or more data processing apparatus connected by one or more computer networks or other suitable communication networks.

The data processing apparatus 302 can include hardware or firmware devices including one or more processor(s) 306, one or more additional device(s) 308, a non-transitory computer readable medium 310, a communication interface 312, and one or more user interface device(s) 314. The processor(s) 306 is capable of processing instructions for execution within the data processing apparatus 302, such as instructions (e.g., of the process definition program 304) stored on the non-transitory computer readable medium 310, which can include a storage device such as one of the additional device(s) 308.

In some implementations, the processor(s) 306 is a single or multicore processor, or two or more central processing units (CPUs). The data processing apparatus 302 uses its communication interface 312 to communicate with one or more computer(s) 318, for example, over the network 316. Thus, in various implementations, the processes described can be run in parallel, concurrently, or serially, on a single or multi-core computing machine, and/or on a computer cluster/cloud, etc.

Examples of user interface device(s) 314 include a display, a touchscreen display, a speaker, a microphone, a tactile feedback device, a keyboard, a mouse, and a headset or heads-up display of a virtual reality or augmented reality environment system. Moreover, the user interface device(s) 314 need not be local device(s) but can be remote from the data processing apparatus 302, e.g., user interface device(s) 314 accessible via one or more network 316. For example, the user interface device(s) 314 can be a smartphone or a tablet computer of the user, e.g., for an augmented reality implementation. The data processing apparatus 302 can store instructions that implement operations as described in this document, for example, on the non-transitory computer readable medium 310, which can include one or more additional device(s) 308, for example, one or more of a floppy disk device, a hard disk device, an optical disk device, a tape device, and a solid-state memory device (e.g., a RAM drive).

Moreover, the instructions that implement the operations described in this document can be downloaded to the non-transitory computer readable medium 310 over the network 316 from one or more computer(s) 318 (e.g., from the cloud). In some implementations, the data processing apparatus 302 is a smartphone or a tablet computer. In some implementations, the RAM drive is a volatile memory device to which the instructions are downloaded each time the computer is turned on.

FIG. 4 is a flowchart illustrating a method 400 for a system integration platform, in accordance with some embodiments. As can be seen in FIG. 4, the method begins by a user defining 402, through a no-code graphical user interface, a sequence of functionality blocks, which together form a user-defined process 210 to be executed by the system integration platform 104. Commonly the user-defined process 210 represents some sort of business logic that the user would like to execute. Each functionality block is configured to execute an operation on one or more input parameters to the functionality block to produce one or more output parameters from the functionality block.

Typically, the functionality blocks can be selected from a library of functionality blocks, which may be local or remote. The user may, for example, see a view similar to the one shown in FIG. 5 on the user interface, where a number of functionality block are listed along with a brief description of what operations each of these can perform. For example, there can be functionality blocks that filter data, that branch to two or more different blocks, that merge incoming data from two or more blocks, that perform conditional operations, that perform operations for each element in a list, etc. As the skilled person realizes, the range of possible operations for the functionality blocks can be very substantial. In some embodiments, more detailed information about each functionality block can be obtained by clicking on the block or hovering over the functionality block with the cursor, etc. Once the user has decided which functionality block to use, the user can drag-and-drop (or copy-and-paste, etc.) the functionality block onto a canvas and connect it to other functionality blocks to form the user-defined process 210.

In some embodiments, when defining the user-defined process 210, the user may need to configure certain parameters for the functionality blocks. This can be done, for example, by clicking on the functionality block, which opens a dialog window into which the user may enter various configuration parameters that may be necessary to communicate with the source systems or destination systems. The dialog window may prompt the user to fill in certain configuration parameters, such as IP address, secret key, type of security authorization, etc., which is typically readily available to the user. However, the user is shielded from viewing the underlying programming code and how these configuration parameters are used to communicate with the source system(s) and destination system(s), respectively, again making the design process very intuitive and easy to perform by the user. Once the sequence of functionality blocks has been defined, it can be saved, either locally or in some remote location, for example, in a cloud-computing environment, where it can be accessed when needed.

Next, once the defined sequence of blocks has been deployed in the system integration platform 104, source system data is received 404 from one or more source system(s) 102. The source system data includes one or more input parameters for the first functionality block in the sequence of functionality blocks. In some embodiments, the source system data is received by the user-defined process 210 requesting the source system data from the source system(s), whereas in some embodiments, the source system data is pushed to the user-defined process 210 by the source system(s). The requests and/or provisions can be configured by the user to occur, for example, in response to certain triggers. These triggers can be based on essentially any type of event that may occur in the system and do not need to be related to the source system itself. For example, there could be trigger that initiates the user-defined process 210 to fetch data from the source system(s) on some kind of regular schedule, or in response to some kind of triggering event, such as a new order for a particular product coming in, a shipment of components arriving, or a certain update being made in a spreadsheet, etc., just to mention a few examples.

Once the source system data has been received, it is processed, 406, by traversing the sequence of functionality blocks that form the user-defined process 210, in a unidirectional manner from the beginning to the end of the sequence of functionality blocks. Thus, a user-defined process 210 in accordance with the various embodiments described herein never "loops back" to the source system(s), but instead it proceeds through some kind of path formed by the functionality blocks to the destination system(s), where the output parameter(s) from a functionality block serves as the input parameter(s) for one or more immediately subsequent functionality blocks. In the event that there is a need to provide some kind of "feedback" from the destination system(s) to the source system(s), a separate user-defined process 210 can be created, which is also configural and unidirectional, as described above, but in the opposite direction.

The result of the processing by the user-defined process 210 of the source system data is referred to as destination system data, and is eventually output, 408, from the last functionality block in the sequence of functionality blocks in the system integration platform, which ends the method 400.

As was described above with respect to FIG. 2, source adapters (e.g., source adapter 202) ensure that the system integration platform 104 can communicate with the respective source system(s) 102, and destination adapters (e.g., destination adapters 204, 206) ensure that the system integration platform 104 can communicate with the destination systems. That is, the source system does not need to include any application program interface (API) to communicate with any destination system, and vice versa, but it is sufficient to for the source system and destination system, respectively to be able to communicate with the system integration platform 104.

All communication between the blocks inside an integration section 120, when carrying out a user-defined process 210, is done using a standard data format. In some embodiments, this data can be formatted as a String, Boolean, Json, Numeric, Integer, or Unsigned Integer, just to mention a few options. Individual functionality blocks may have restrictions on data types or ranges of data values etc., that they can accept or output. Such restrictions may also serve as rules for the order in which the sequence of functionality blocks can be put together in operation 402, discussed above.

Figure 5:
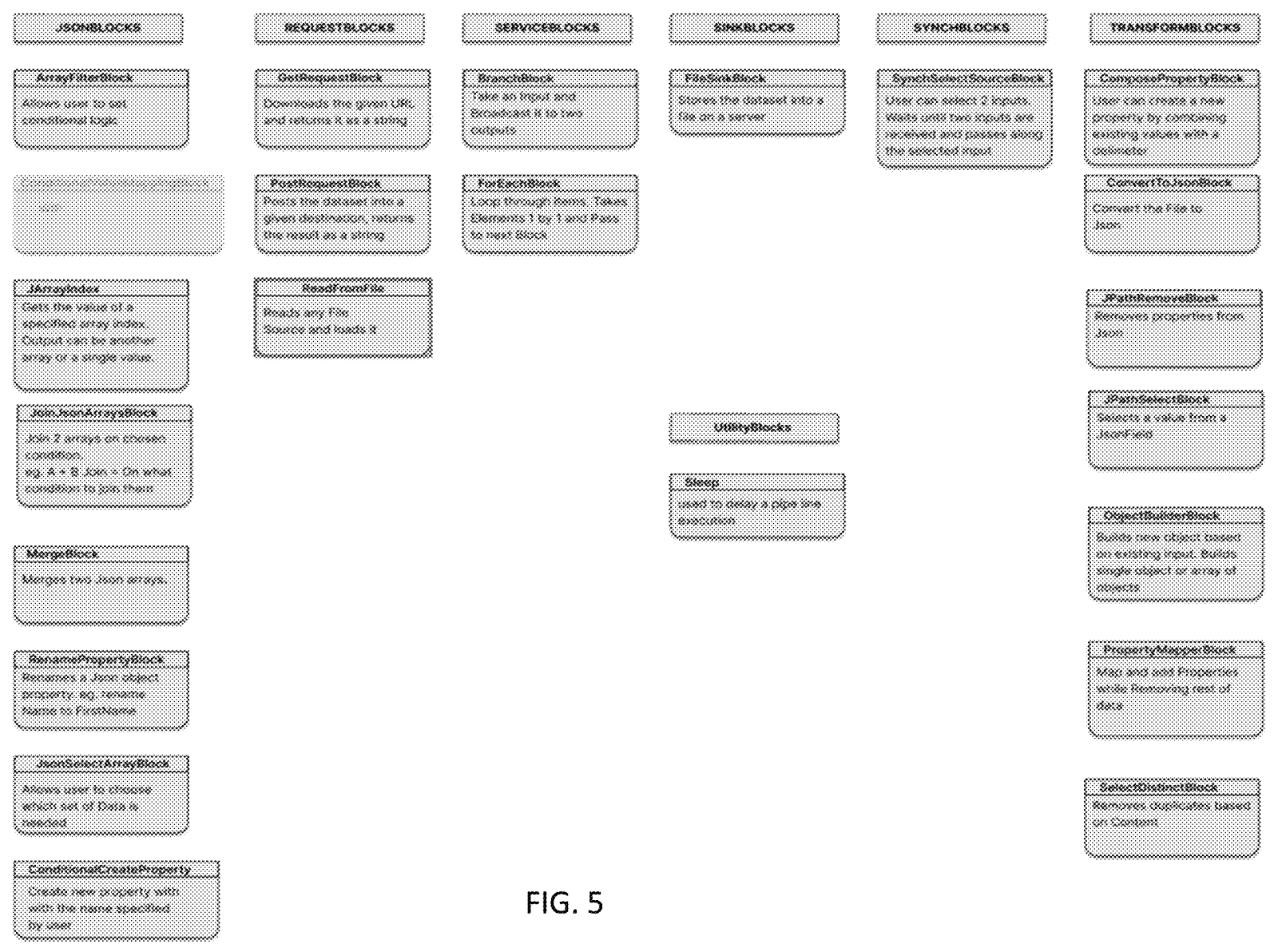

As was mentioned above, some examples of functionality blocks are illustrated in FIG. 5. As can be seen in FIG. 5, in some embodiments, the various functionality blocks can be organized into categories based on what operations they perform. For example, in the illustrated embodiment of the functionality block library, there is a JSON block category which contains, a Request block category, a Service block category, a Sink block category, a Synch block category, a Transform block category, and a Utility block category. Each functionality block in the respective categories has a brief description of the functions it performs, such that a user easily can select the appropriate block for use (or to get more information about the block). For example, FIG. 5 shows a PostRequestBlock which posts the dataset into a given destination and returns the result as a string, a BranchBlock which takes an input and broadcasts it to two outputs, a ForEachBlock which loops through a list of items one by one and passes them to the next block, a Sleep Block which delays an execution, and a SynchSelectSourceBlock which waits until two inputs are received before a selected input is passed along to the next block.

Figure 6:
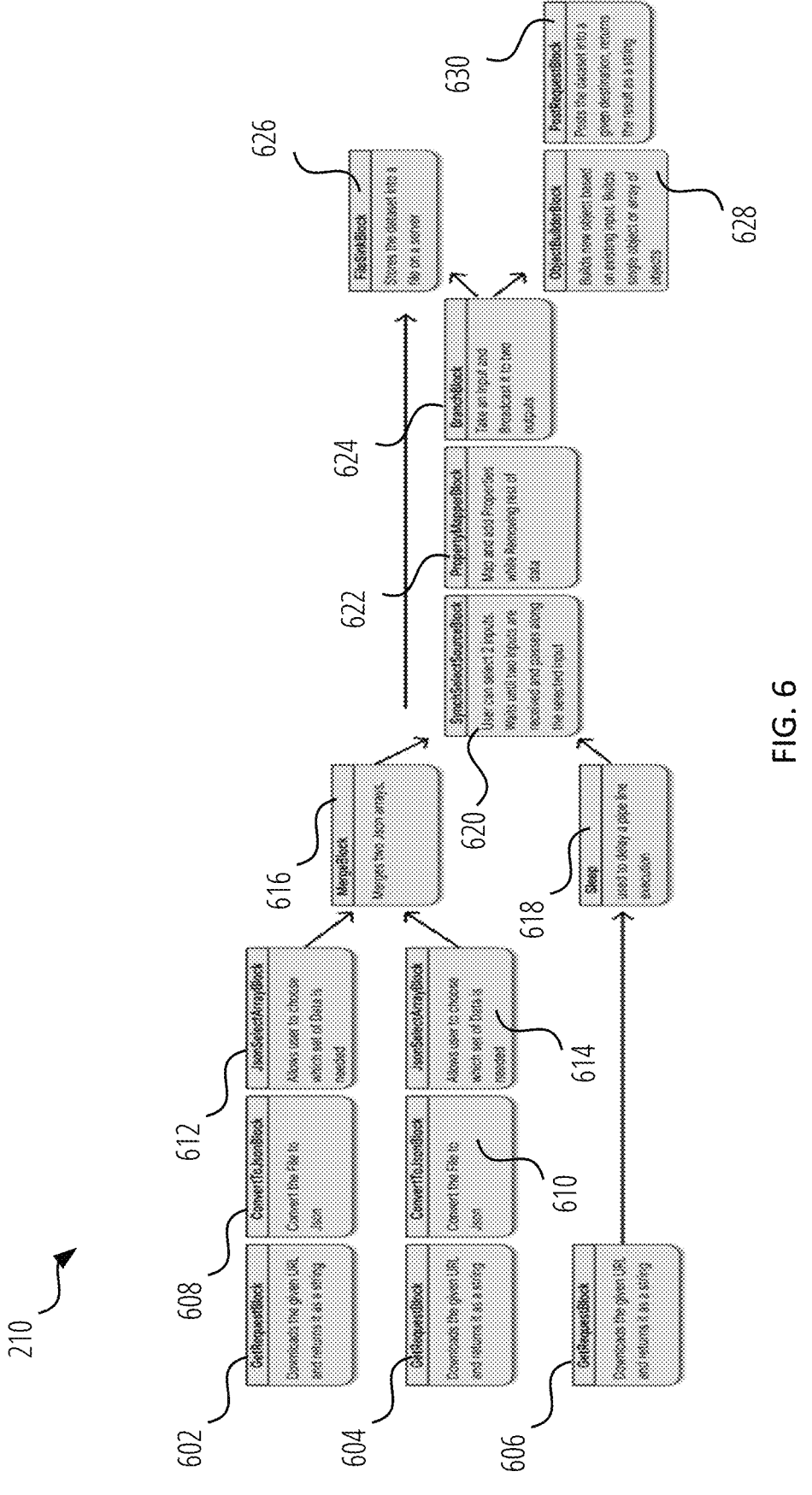
FIG. 6 is a schematic diagram showing an exemplary user-defined MES process in accordance with some embodiments.

FIG. 6 shows an example of a user-defined process 210 in accordance with one embodiment. As can be seen in FIG. 6, the user-defined process 210 starts by downloading, in parallel, three URLs (blocks 602, 604, 606). Two of these are converted to JSON (blocks 608, 610), and then a user may select what data is needed (blocks 612, 614), prior to merging the two JSON arrays (block 616). In the meantime, the third downloaded URL is delayed (block 618) until the merging is completed. Next, the merged URLs and the third URL are synchronized (block 620), that is, when two inputs have been received one of them is selected according to some rule. The selected input then undergoes mapping and adding of properties according to some rule, along with removal of certain data (block 622). After mapping, the data is broadcast to two outputs (block 624). In the first branch, the data is stored in a file on a server (block 626) and in the second branch, an object or array of objects is built (block 628) and the destination system data is finally posted into a given destination (block 630). It should be noted that this is merely a generic example description of a user-defined process 210 and that the skilled person can create essentially any imaginable user-defined process 210 by selecting an appropriate set of functionality blocks and arranging them accordingly.

A typical scenario from a user's point of view when designing a user-defined process would be as follows: In the user interface, the user starts by selecting an integration block that fetches information from a system. The user can enter for example an IP Address, a User name, a password, and/or an API key in fields defined for the block. No coding knowledge is needed in this stage. The system from which information is fetched (i.e., the source system) can be, for example, an ERP system which contains large amounts of data that may or may not be interesting for an MES (i.e., the destination system). The user can for example choose out of all the data in the ERP system a Bill of Material (BOM) that is interesting for the MES, and also choose from different sources of data besides the ERP system. The user designing the process may be aware that another source of data may take a longer time to receive data. In this case, the user can decide to merge all data for their MES at a specific time when all necessary data is present, by selecting a different block providing this functionality. As the data is merged, some parts may or may not be compatible with the MES, or some parts of the data may need to be removed to be mapped properly. For example, a first data source may contain the data "car", and another source (e.g., from an end user website) inputs the color blue, and a third source may contain "blue car with 4 racing wheels." Data from all three data sources can be properly merged in a logic box. Once the data string is correct, a branching block can pass the data both to be stored, and to continue to build the array of data. Once the Array is completed, it can be posted to another receiving service.

The embodiments of the present invention described herein also relates to a computer software function for representing manufacturing processes on a graphical user interface of a computing device, according to what has been described above. Such a computer software function is then arranged to, when executing, perform the above-described operations, which are also recited in the claims. The computer software function is arranged to execute on physical or virtual hardware of the data processing apparatus 302, as described above.

Embodiments of the subject matter and the functional operations described in this specification can be implemented in digital electronic circuitry, or computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various computing model infrastructures, such as web services, distributed computing, and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and one or more processors of any suitable digital computer. Generally, a processor will receive instructions and data from a read-only memory (ROM) or a random-access memory (RAM), or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROM and DVDROM disks; network attached storage; and various forms of cloud storage. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode), or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be sensory feedback, e.g., visual feedback, auditory feedback, or tactile feedback; and input from the user can be received in various forms, including acoustic, speech, or tactile input.

The computing system can include clients and servers. A client and server are generally remote from each other and interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any suitable combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but as descriptions of features specific to implementations of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments. The described program components and systems can be integrated into a single software product or packaged into multiple software products.

Thus, embodiments of the invention have been described. Other embodiments are within the scope of the following claims. For example, in some embodiments, several functionality blocks in the library shown in FIG. 5 can be combined into larger units of functionality blocks and perform more complex operations, which may be more convenient for a user to select when putting together the user-defined process 210 compared to assembling individual blocks. Various types of enhancements to the method 400 can also be made. For example, in some embodiments, there can be a verification of the user-defined process 210 prior to deployment to ensure that the user-defined process 210 will work as intended. In some embodiments, there may be a log that records how the user-defined process 210 performs during execution, such that any data can be subsequently recreated, for example, for forensic purposes. Yet further embodiments may include various degrees of Artificial Intelligence (AI), Machine Learning (ML), and so on to further automate and enhance the user experience during the creation of the processes. Thus, many variations to the above examples lie well within the scope of the attached claims and within the capabilities of a person having ordinary skill in the art.

What is claimed is:

1. A method for processing, by a system integration platform, data originating in one or more source systems, into data ingestible by one or more destination systems, wherein the one or more source systems and the one or more destination systems each comprises an application programming interface enabling communication with the system integration platform, and neither the one or more source systems nor the one or more destination systems communicate directly with one another, comprising:

defining, through a no-code graphical user interface, a sequence of functionality blocks, wherein the sequence of functionality blocks defines a process to be performed by the system integration platform, and wherein each functionality block is configured to execute an operation on one or more input parameters to the functionality block to produce one or more output parameters from the functionality block;

receiving, by the system integration platform, source system data, the source system data comprising one or more input parameters for a first functionality block in the sequence of functionality blocks;

processing, by the system integration platform, data from the one or more source systems by traversing the sequence of functionality blocks in a strictly unidirectional manner from a beginning to an end of the sequence of functionality blocks, without looping back to any preceding functionality block or to any source system, wherein one or more output parameters from a functionality block serves as input parameters for one or more immediately subsequent functionality blocks; and outputting, from a last functionality block in the sequence of functionality blocks in the system integration platform, destination system data to be ingested by the one or more destination systems.

2. The method of claim 1, wherein the processing is initiated by the system integration platform, by requesting data from, or listening to data provided by, at least one source system among the one or more source systems.

3. The method of claim 1, wherein one or more of the functionality blocks are pre-configured to execute the operation on the input parameters to the functionality block.

4. The method of claim 1, wherein one or more aspects of the operation are configurable by a user by setting a value of a predetermined set of functionality block-specific configuration parameters.

5. The method of claim 1 wherein each functionality block has a functionality block type, and wherein a set of rules specify what block types may precede or follow other functionality block types in the sequence of functionality blocks.

6. The method of claim 5, wherein the set of rules comprises input/output data matching rule.

7. The method of claim 1, wherein at least one of the functionality blocks has an associated completion condition that must be fulfilled prior to sending the one or more output parameters from the functionality block to the one or more subsequent functionality block.

8. The method of claim 1, further comprising grouping two or more functionality blocks into a unit, wherein the unit as a whole defines a more complex operation compared to that of a single functionality block, the unit being arranged to execute said more complex operation on one or more input parameters to the unit to produce one or more output parameters from the unit, and including the unit in the sequence of functionality blocks that defines the process.

9. The method of claim 8, wherein the unit is configured to receive the same input parameters as the first functionality block comprised in the unit and to produce the same output parameter as the last functionality block comprised in the unit.

10. The method of claim 1, wherein defining a sequence of functionality blocks further comprises:

performing a verification of the sequence prior to processing the one or more input parameters from the source system, to ensure compliance with the rule; and generating an alert in response to an incomplete verification.

11. The method of claim 1, further comprising keeping information about a state of an ongoing processing of the received input parameters.

12. The method of claim 1, further comprising:

keeping a log regarding the operations performed by each functionality block in the sequence of functionality blocks.

13. The method of claim 1, wherein the one or more source systems includes: an Enterprise Resource Planning System Planning system, a Product Lifecycle Management system, a Warehouse Management system, a Content Management system and/or a Customer Relationship Management system.

14. The method of claim 1, wherein the one or more destination systems includes:

a Manufacturing Execution System comprising one or more subsystems.

15. The method of claim 14, wherein the one or more subsystems includes: a vision system, production machinery, robots, devices, sensors, and/or tools.

16. The method of claim 1, wherein the processing is interpreted by a computer program providing the processing functionality block dynamically and on-the-fly based on the configuration parameters of each functionality block and how the functionality block are connected in the sequence.

17. The method of claim 1, wherein the outputting, from the last functionality block is done on the initiative of the last functionality block.

18. The method of claim 1, further comprising:

in response to receiving changes through a no-code graphical user interface to the sequence of functionality blocks, changing the processing dynamically to perform a revised process by the system integration platform in accordance with the changed sequence of functionality blocks.

19. A system for processing data originating in a source system into data ingestible by a destination system, comprising:

a memory; and a processor, wherein the memory contains instructions that, when executed by the processor perform a method in accordance with claim 1.

20. A non-transitory computer-readable storage medium for processing, by a system integration platform, data originating in one or more source systems, into data ingestible by one or more destination systems, wherein the one or more source systems and the one or more destination systems each comprises an application programming interface enabling communication with the system integration platform, and neither the one or more source systems nor the one or more destination systems communicate directly with one another, the computer-readable storage medium including instructions that when executed by a computer, cause the computer to:

define, through a no-code graphical user interface, a sequence of functionality blocks, wherein the sequence of functionality blocks defines a process to be performed by the system integration platform, and wherein each functionality block is configured to execute an operation on one or more input parameters to the functionality block to produce one or more output parameters from the functionality block;

receive, by the system integration platform, source system data, the source system data comprising one or more input parameters for a first functionality block in the sequence of functionality blocks;

process, by the system integration platform, data from the one or more source systems by traversing the sequence of functionality blocks in a strictly unidirectional manner from a beginning to an end of the sequence of functionality blocks, without looping back to any preceding functionality block or to any source system, wherein one or more output parameters from a functionality block serves as input parameters for one or more immediately subsequent functionality block; and output, from a last functionality block in the sequence of functionality blocks in the system integration platform, destination system data to be ingested by the one or more destination systems.

* * * * *